Aug. 4, 1953  H. W. TREVASKIS  2,647,535
FLUID PRESSURE VALVE
Filed March 10, 1948  3 Sheets-Sheet 1

INVENTOR
Henry William Trevaskis
by Benj. T. Rauber
his attorney.

Aug. 4, 1953

H. W. TREVASKIS 2,647,535

FLUID PRESSURE VALVE

Filed March 10, 1948

INVENTOR
Henry William Trevaskis
by Benj. T. Rauber
his attorney

Aug. 4, 1953 H. W. TREVASKIS 2,647,535
FLUID PRESSURE VALVE
Filed March 10, 1948 3 Sheets-Sheet 3
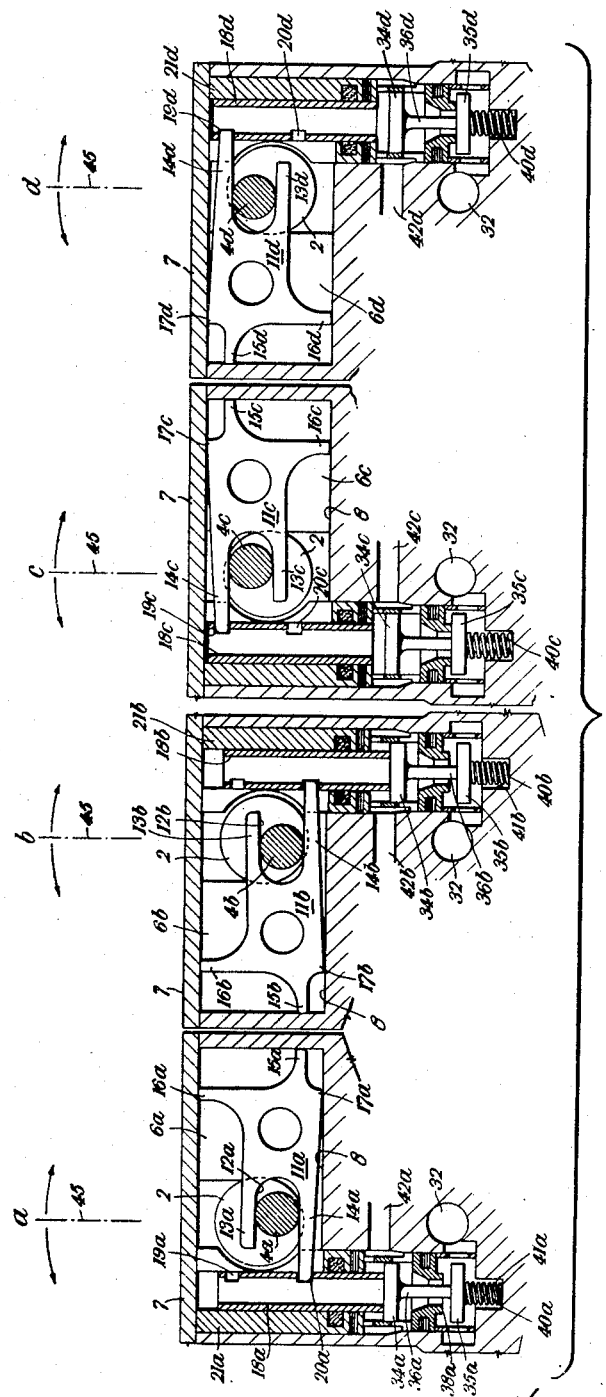
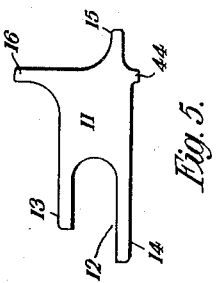
INVENTOR
Henry William Trevaskis
by Benj. T. Rauber
his attorney Patented Aug. 4, 1953

2,647,535

UNITED STATES PATENT OFFICE 2,647,535

FLUID PRESSURE VALVE

Henry William Trevaskis, Solihull, England, assignor to Dunlop Rubber Company Limited, London County, England, a British company Application March 10, 1948, Serial No. 14,032
In Great Britain March 13, 1947

7 Claims. (Cl. 137—622)

This invention relates to fluid pressure valves of the type used for controlling the movement of mechanism disposed remote from the pressure valve, and, more particularly, for controlling a pneumatically or hydraulically operated mechanism that is adapted to control the movement of aircraft undercarriages, flaps or the like.

Fluid pressure valves of the above type should be capable of admitting fluid pressure to the mechanism that operates the undercarriages or the like of aircraft, of ensuring that the fluid pressure is maintained therein as long as may be desired, and of permitting the fluid pressure to escape when desired. Each pressure valve therefore has virtually three chambers, one chamber in communication with the source of fluid supply, a second or operating chamber in communication with the mechanism that operates the undercarriages or the like, and a third or exhaust chamber. There must be an inlet valve to permit fluid pressure to pass from the first to the second chamber and an exhaust valve to permit the fluid pressure to pass from the second chamber when it is no longer required. Both valves should not of course be open at the same time.

It is already known to provide a fluid pressure valve for brakes and the like having three chambers, a supply chamber in communication with a source of fluid pressure supply, an operating chamber in communication with for example a braking circuit and an exhaust chamber. Sometimes the inlet valve and exhaust valve are two independent parts and sometimes they are co-axial and substantially move together. In the latter case an operating member co-axial with the valves forms a seating for the exhaust valve, and by the interposition of springs it can be ensured that the movement of the operating member in one direction first closes the exhaust valve before the inlet valve opens and the movement in the opposite direction first closes the inlet valve before the exhaust valve opens. It is known to apply an axial load to the operating member in order to effect the desired movements of the valves but the consequential levers occupy much space. Such constructions are therefore not suitable when space and weight considerations are of primary importance, and are even less suitable when it is desired to control selectively the operation of a mechanism which is adapted to control the movement of two or more other mechanisms.

It is an object of this invention to provide a fluid pressure valve of the type having supply, operating, and exhaust chambers and co-axial inlet and exhaust valves which is compact in size and light in weight.

It is a further object of this invention to provide a fluid pressure valve which may be employed selectively to operate a mechanism which is adapted to control the movement of two or more other mechanisms.

According to the present invention a fluid pressure valve for the remote control of mechanism of the type having supply, operating, and exhaust chambers, co-axial inlet and exhaust valves, and an operating member co-axial with the said valves forming a seating for the said exhaust valve comprises an angularly displaceable member adapted to move the said operating member axially, and a rocker shaft adapted to actuate the said angularly displaceable member.

Preferably two such valve units are associated together and have a rocker shaft in common to constitute a control valve suitable, for example, for a double-acting jack adapted to control the movement of the undercarriages, flaps or the like of aircraft. If four such valve units are associated together and suitably adapted they constitute a fluid pressure valve suitable for a double-acting jack having two co-axial cylinders each provided with a piston and piston rod.

In order that the invention may be more clearly understood and carried into effect the same will now be more particularly described with reference to the accompanying drawings in which:

Fig. 3 shows diagrammatic representations at $a$, $b$, $c$ and $d$, of the angularly displaceable members and associated parts with the rocker shaft in its mid-position.

Fig. 5 is a side view of an alternative form of angularly displaceable member.

Figure 1:
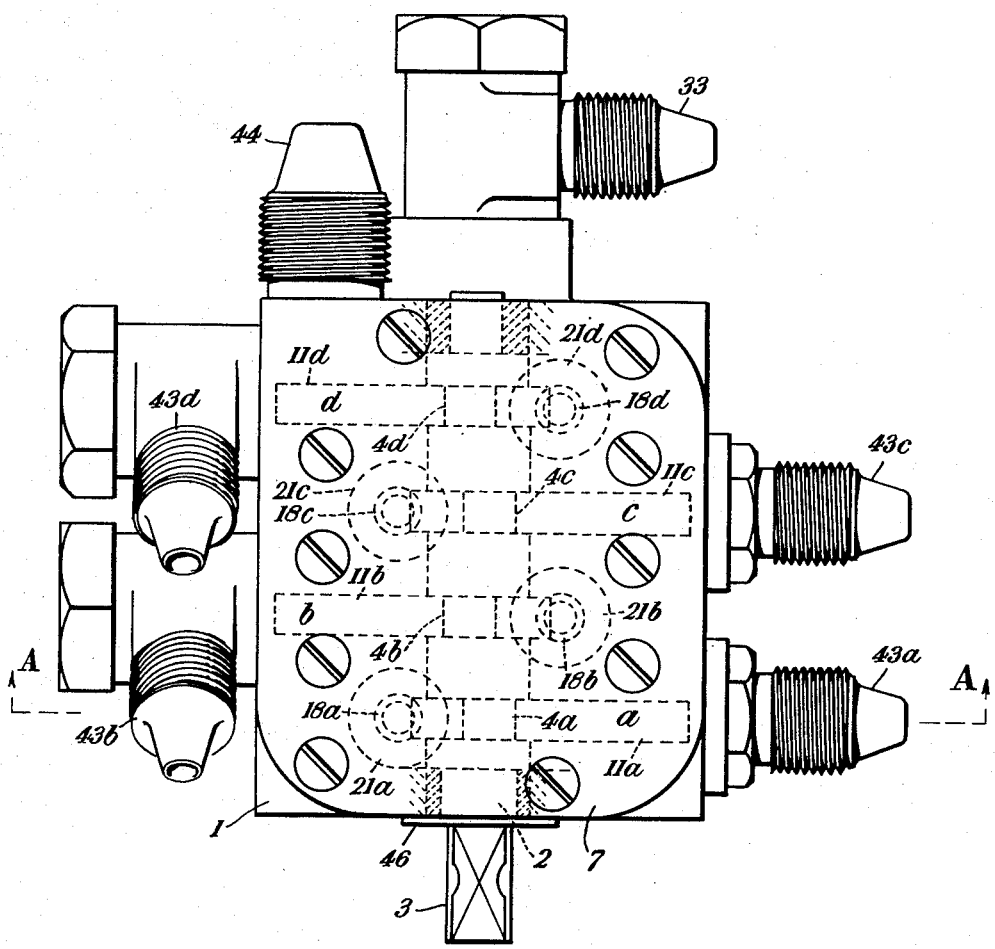
Fig. 1 is a plan view of a fluid pressure valve suitable for selective control of a twin-cylinder double-acting jack which has two co-axial cylinders each provided with a piston and piston rod.
Figure 2:
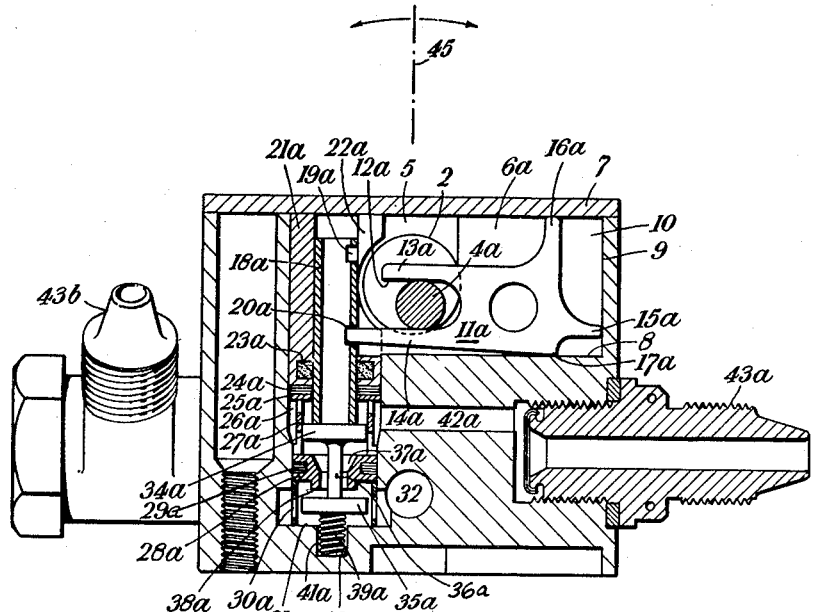
Fig. 2 is a sectional side view of Fig. 1 on the lines A—A and on a smaller scale illustrating the rocker shaft in its mid-position.

Referring to Figs. 1 to 4 the pressure valve has a base or housing 1 in which is rotatably mounted a longitudinally disposed rocker shaft 2 adapted for manual operation external of the housing at 3 by handle means indicated at 45 (Figure 3) and, at four equi-spaced positions $a$, $b$, $c$, $d$, along its length, having eccentric formations 4a, 4b, 4c, 4d, which are located in a cavity 5 formed in said housing. Each eccentric is circular in cross-section and its diameter is approximately equal to half the diameter of the rocker shaft and two eccentrics 4a and 4d are disposed opposite each other on one diametrical axis and the other two eccentrics 4b and 4c are disposed opposite each other on another diametrical axis and the two axes are angularly spaced apart at 45°.

Four pockets 6a, 6b, 6c and 6d are formed in the housing and extend from the cavity and open on one face of said housing and said face has applied to it a cover plate 7. The pockets are each provided by a base 8, and end wall 9 and two parallel side walls 10 and said pockets are spaced apart to coincide with the eccentrics on the shaft and adjacent pockets are disposed on opposite sides of said shaft. In the respective pockets are flat plate-like angularly displaceable members 11a, 11b, 11c and 11d the plane of each of which is disposed at right angles to the axis of the shaft. The angularly displaceable members and parts associated therewith are substantially identical at each position and therefore, as far as is appropriate, the angularly displaceable member 11a and its associated parts will be described with reference to Figs. 1 and 2 as being representative except where otherwise stated.

The angularly displaceable member 11a is bifurcated at its one end to form a slot 12a which is engaged by the eccentric 4a intermediate the ends of said angularly displaceable member. The bifurcation provides two branches 13a and 14a which are disposed longitudinally of the angularly displaceable member and the branch 14a is longer than the branch 13a and constitutes an operating branch to be hereinafter referred to. That end of the angularly displaceable member remote from the slot has a finger 15a disposed parallel and substantially opposite to the operating branch 14a and the edge of said angularly displaceable member formed by the branch 13a has a finger 16a, said fingers extending in the plane of the angularly displaceable member. Opposite the finger 16a the angularly displaceable member has a corner 17a. The end finger 15a abuts against the end wall 9, the edge finger 16a abuts against the cover plate 7 and the corner 17a abuts against the base 8. The angularly displaceable member is therefore supported within the side walls 10 of the respective pocket, at its slot 12a, and on its periphery at the extremities of its two fingers 15a and 16a and at the corner 17a.

On the opposite side of the shaft 2 to the pocket 6a is a hollow cylinder 18a the axis of which is disposed parallel to the plane of the angularly displaceable member and substantially at right angles to the axis of the slot 12a. The wall of the hollow cylinder ih formed with an aperture 19a adjacent the upper end of the tube and with another aperture 20a at approximately the middle of said tube and, regarding the angularly displaceable member, 11a, the aperture 20a is engaged by the operating branch 14a. The hollow cylinder 18a is slidably mounted in a bush 21a secured in a blind bore 26a formed in the housing and coaxial with said hollow cylinder, and one end of said bush abuts against the inner face of the cover plate and its wall is gapped from this end at 22a for part of its length for the passage of the operating branch 14a. A felt washer 23a is located in the bore of the bush adjacent its other end and said washer surrounds the hollow cylinder and this end of the bush abuts against an annular sealing washer 24a against which is applied a metal washer 25a, said sealing and metal washers being the same external diameter as the diameter of the bore 26a. A first spacing tube 27a, the wall of which is perforated, is disposed co-axial with and is of smaller diameter than the bore, and said tube abuts at one end against the metal washer 25a and at its other end against one face of a valve-seating ring 28a whose periphery has an annular seal 29a and fits the bore. The chamber formed in said bore between the metal washer and the valve-seating ring will hereinafter be referred to as the operating chamber. The other face of the valve-seating ring abuts against one end of a second spacing tube 30a the wall of which is perforated and the other end of which abuts against the end face 31a of the bore which, at this end, is of a diameter larger than the diameter of the second spacing tube for a length less than the length of said tube, and the chamber formed between the end of the bore and the adjacent face of the valve-seating ring will hereinafter be referred to as the supply chamber.

An inlet duct 32 is adapted to be connected to a supply source of fluid pressure by a union 33 and said duct is formed in the housing to extend parallel with and below the shaft. The duct is in communication with the four supply chambers of which adjacent chambers are disposed on opposite sides of the duct.

Two disc-like valve heads 34a and 35a are axially spaced apart and are mounted on a stem 36a to form an integral unit which is co-axial with the hollow cylinder, and said stem passes through, and is of smaller diameter than an axial passage 37a in the valve-seating ring, whereby the head 34a, hereinafter referred to as the exhaust valve head, is disposed within the operating chamber to co-operate with one end of the hollow cylinder and to slide within and be supported by the first spacing tube 30a, while the other head 35a, hereinafter referred to as the inlet valve head, is disposed within the supply chamber to co-operate with a seating 38a formed on the adjacent side of the valve-seating ring. A spigot 39a extends from the face of the inlet valve head opposite that face which co-operates with the valve seat and said spigot supports one end of a coiled compression spring 40a whose other end is located in a socket 41a formed in the housing at the closed end of the bore.

Four passages 42a, 42b, 42c and 42d are formed in the housing and each passage communicates with a different one of the four operating chambers and each passage leads to one of four unions 43a, 43b, 43c and 43d each adapted to be connected to the jack.

As shown in Fig. 3 the angularly displaceable members 11a, 11b bear at their rehpective corners 17a, 17b on the base 8 of the respective pockets 10, and their operating branches 14a, 14b engage the apertures 20a, 20b respectively. The angularly displaceable members 11c, 11d bear at their respective fingers 15c, 16d on the base 8 of the respective pockets 10, and their operating branches 14c, 14b engage the apertures 19c, 19d respectively. The handle means 45 and rocker shaft 2 are shown in mid-position and the inlet valves 35a, 35b are open whilst the inlet valves 35c, 35d are closed.

Figure 4:
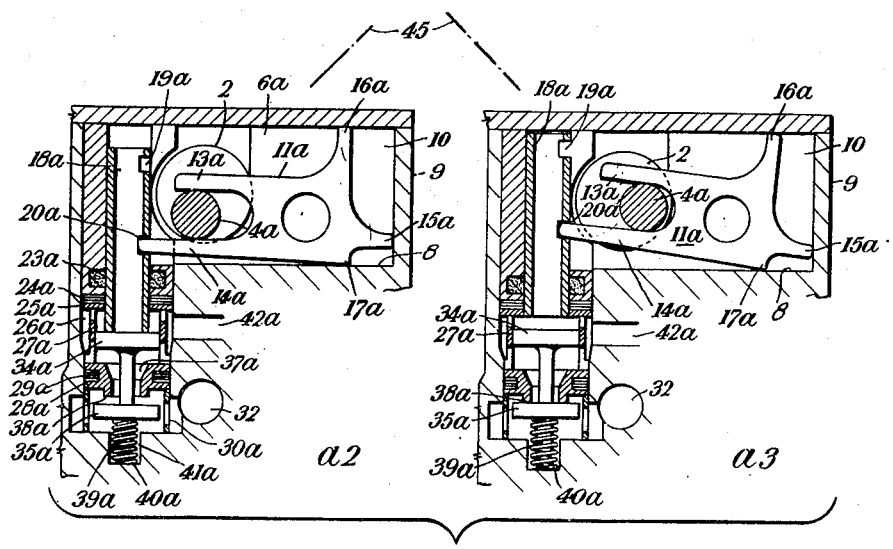
Fig. 4 shows diagrammatic representations at $a2$ and $a3$ of the angularly displaceable member shown in Fig. $3a$ but in its other positions.

In Fig. 4 (a2) the rocker shaft 2 has been rocked through an angle of 45° in a clockwise direction from its mid-position and no movement of the angularly displaceable member occurs so that the inlet valve remains open while the exhaust valve remains closed, whereas in (a3) (Fig. 4) said rocker shaft has been rocked through an angle of 45° in an anti-clockwise direction from its mid-position thus moving the angularly displaceable member so that the inlet valve is closed while the exhaust valve is opened.

A pointer 46 is secured to the rocker shaft to indicate the angular position of said shaft and said pointer is provided with a stop peg (not shown) which engages an arcuate groove in the housing.

In an alternative form of the invention a pressure valve as above described is provided but has angularly displaceable members as illustrated in Fig. 5. Each of said members having a short side finger 44 opposite the side finger 16.

In operation, by rocking the shaft each hollow cylinder can be moved by its respective angularly displaceable member to either of two extreme positions, in one position said hollow cylinder abuts against the exhaust valve head to close the end of said cylinder and to maintain the inlet valve head off its seat against spring action thereby to allow fluid pressure to pass from the supply chamber to the operating chamber and via the respective passage to the jack, and in the other position said hollow cylinder is withdrawn in a direction away from the inlet valve seat whereby the compression spring moves the inlet valve hend onto said seat and the exhaust valve head makes an equal movement which is less than the movement of the hollow cylinder so that the fluid pressure passes back into the operating chamber from the jack and through the bore of the hollow cylinder to the cavity which constitutes an exhaust chamber and is in communication with a union nozzle 44 external of the housing.

The relative positions of the eccentrics and the slots in the respective angularly displeacable members is such that for each of the three angular positions of the rocker shaft different combinations of two inlet valves are open and two exhaust valves closed.

It should be appreciated that while the pressure valve above described has four valve units each of which comprises inlet and exhaust valves, a hollow cylinder, and an angularly displacable member, a pressure valve having one or any other number of such units is also within the scope of the invention.

Having described my invention, what I claim is:

1. A fluid pressure valve for the remote control of mechanism having supply, operating and exhaust chambers, co-axial inlet and exhaust valves, a recessed operating member co-axial with the said valves forming a seating for the said exhaust valve, a rocker shaft formed with an eccentric having a cross section smaller than that of said shaft, an angularly displaceable member positioned to move the said operating member axially, said angularly displaceable member being bifurcated at one extremity to form a slot to engage said eccentric, and to form a branch extending to engage the recess of said operating member, said displaceable member having at least two projecting fingers at the extremity opposite said bifurcation positioned to contact the walls of said exhaust chamber whereby the angularly displaceable member rocks relative to the walls of the exhaust chamber when actuated by the said rocker shaft and moves the said movable member axially.

2. The fluid pressure valve of claim 1 in which the rocker shaft is rotatable between three positions and the said eccentric is so positioned relative to the said slot that rocking of the shaft between the mid-position and one adjacent position operates the valves while rocking between the mid-position and the other position does not operate the valves.

3. A fluid pressure control mechanism comprising a housing having two valve mechanisms each comprising supply, operating and exhaust chambers, a valve seat between said supply and operating chambers, a hollow longitudinally slidable operating member having a recess formed therein, a passage through said operating member connecting said operating and exhaust chambers, a pair of connected valves co-axial with and movable by said operating member, one of said valves on the operating side of said valve seat being positioned to be contacted by said operating member to close said passage and the other valve being movable from said valve seat on further movement of said operating member, an angularly displaceable member bifurcated at one extremity to form a slot, one branch of said bifurcated member being extended to fit into the recess in said longitudinally slidable operating member, said two valve members being arranged in side by the side relationship and a common rocker shaft provided with two eccentrics, one for each said bifurcated member to engage the slot of said bifurcated member to actuate said bifurcated members of said valve mechanism.

4. A fluid pressure mechanism as defined in claim 3 in which said angularly displaceable members are disposed on opposite sides of the common rocker shaft, each angularly displaceable member engaging one eccentric of the common rocker shaft and in which said shaft is rockable between three positions so that rocking of the shaft between mid-position and one position displaces the valve of one mechanism only while rocking between mid-position and the other adjacent position displaces the valve of the other said mechanism.

5. A fluid pressure control mechanism comprising a housing having four valve mechanisms in side by side relationship, each said valve mechanism comprising supply, operating and exhaust chambers, a hollow longitudinally slidable operating member having a recess formed therein, a passage through said operating member connecting said operating and exhaust chambers, a pair of connected valves co-axial with and movable by said operating member, one of said valves on the operating side of said valve seat being positioned to be contacted by said operating member to close said passage and the other valve being movable from said valve seat on further movement of said operating member, an angularly displaceable member bifurcated at one extremity to form a slot, one branch of said bifurcated member being extended to fit into the recess in said longitudinally displaceable operating member, and a common rocker shaft for actuating said valve mechanisms, said shaft being provided with four eccentrics one for each valve member engaging the slot of its respective angularly displaceable bifurcated member whereby said member may be actuated from said common rocker member.

6. A fluid pressure control mechanism comprising a housing having supply, operating and exhaust chambers, a valve seat between said supply and operating chambers, a hollow longitudinally slidable operating member having a recess formed therein, a passage through said operating member connecting said operating and exhaust chambers, a pair of connected valves co-axial with, and movable by said operating member, one of said valves on the operating side of said valve seat being positioned to be contacted by said operating member to close said passage and the other valve being movable from said valve seat on further movement of said operating member, an angularly displaceable member bifurcated at one extremity to form a slot, one branch of said bifurcated member being extended to fit into the recess in said longitudinally slidable operating member and a rocker shaft provided with an eccentric engaging the slot of said angularly displaceable bifucated member, whereby said member may be actuated to operate said valves, the said rocker shaft being rockable between three positions and said eccentric is so positioned relative to said slot that the rocking of said shaft between mid-position and one adjacent position operates the valves while rocking between the mid-position and the other position does not operate the valves.

7. A fluid pressure control mechanism comprising a housing having supply, operating and exhaust chambers, a valve seat between said supply and operating chambers, a hollow longitudinally slidable operating member having a recess formed therein, a passage through said operating member connecting said operating and exhaust chambers, a pair of connected valves co-axial with, and movable by said operating member, one of said valves on the operating side of said valve seat being positioned to be contacted by said operating member to close said passage and the other valve being movable from said valve seat on further movement of said operating member, an angularly displaceable member bifurcated at one extremity to form a slot, one branch of said bifurcated member being extended to fit into the recess in said longitudinally slidable operating member and a rocker shaft provided with an eccentric engaging the slot of said angularly displaceable bifurcated member, whereby said member may be actuated to operate said valves, said angularly displaceable member having two projecting fingers remote from the bifurcation extending into contact with the walls of the exhaust chamber to position said displaceable member in said exhaust chamber.

HENRY WILLIAM TREVASKIS.

References Cited in the file of this patent
UNITED STATES PATENTS

| Number | Name | Date |
| --- | --- | --- |
| 660,735 | Ormerod | Oct. 30, 1900 |
| 1,537,437 | Graffinberger | May 12, 1925 |
| 1,680,331 | Hilke | Aug. 14, 1928 |
| 1,747,910 | Siefarth | Feb. 18, 1930 |
| 2,047,319 | Exley | July 14, 1936 |
| 2,067,612 | Loeffler | Jan. 12, 1937 |
| 2,240,163 | Pick | Apr. 29, 1941 |
| 2,300,112 | Ellinwood | Oct. 27, 1942 |
| 2,336,715 | Casler | Dec. 14, 1943 |